United States Patent
Ozawa (10) Patent No.: US 8,773,735 B2
(45) Date of Patent: Jul. 8, 2014

(54) OPTICAL READER APPARATUS

(75) Inventor: Junya Ozawa, Minamikoma-gun (JP)

(73) Assignees: Nisca Corporation, Minamikoma-gun, Yamanashi-ken (JP); Seiko Epson Corporation, Tokyo (JP)

( * ) Notice: Subject to any disclaimer, the term of this patent is extended or adjusted under 35 U.S.C. 154(b) by 915 days.

(21) Appl. No.: 12/801,641

(22) Filed: Jun. 18, 2010

(65) Prior Publication Data

US 2010/0328736 A1 Dec. 30, 2010

(30) Foreign Application Priority Data

Jun. 25, 2009 (JP) ................................ 2009-150700

(51) Int. Cl.
*H04N 1/04* (2006.01)
*H04N 1/46* (2006.01)

(52) U.S. Cl.
USPC ............ 358/494; 358/474; 358/497; 358/505

(58) Field of Classification Search
None
See application file for complete search history.

(56) References Cited

FOREIGN PATENT DOCUMENTS

| JP | H06-186647 A | 7/1994 |
|----|--------------|--------|
| JP | H10-173841 A | 6/1998 |
| JP | H10-221623 | 8/1998 |
| JP | 2002-214720 A | 7/2002 |
| JP | 2007-110466 A | 4/2007 |

*Primary Examiner* — Thierry Pham
(74) *Attorney, Agent, or Firm* — Manabu Kanesaka (57) ABSTRACT

To provide an image reading apparatus for enabling an optical carriage movably supported in a rail member to be locked reliably in a predetermined position of an apparatus frame without causing failure by shock in transport, one of the apparatus frame and optical carriage is provided with a lock member traveling between a release position and a lock position, and a biasing member for biasing the lock member in a predetermined direction, and the other one is provided with an engagement receiving portion being fitted with an engagement portion formed in the lock member. Then, the engagement portion and the engagement receiving portion are configured to inhibit movements in the scanning direction of the optical carriage in the lock position, and the biasing force of the biasing member is concurrently configured to act on the carriage in the direction orthogonal to the scanning direction so as to increase friction between the carriage and a traveling rail.

6 Claims, 10 Drawing Sheets

OPTICAL READER APPARATUS

BACKGROUND OF THE INVENTION

1. Technical Field

The present invention relates to an image reading apparatus for optically reading an original image on a platen, and more specifically, to improvements in a lock mechanism of an optical carriage for scanning the original image.

2. Description of the Related Art

Generally, this type of image reading apparatus is widely known as an apparatus such as a copier, facsimile and scanner for scanning an image original set on a read platen in a predetermined direction to convert into electric signals by a photoelectric sensor. Therefore, platen glass is disposed in an external casing, and a reading carriage is equipped to be movable along the platen, and is installed with a light-source lamp for emitting light to an original image on the platen, and reflecting mirrors for guiding reflected light from the original image to a photoelectric conversion sensor. Then, the read light from the reflecting mirror is condensed to the photoelectric conversion sensor by a condenser, lens for image formation, and such a structure is known.

Then, as an optical carriage traveling in the (sub) scanning direction along the platen, there are known a structure where the carriage is installed with a light-source lamp and reflecting mirrors, and on the apparatus frame (for example, bottom chassis) side are disposed an image-formation lens for condensing light from the reflecting mirror, and the photoelectric conversion sensor, another structure where the carriage is installed with the image-formation lens and the photoelectric conversion sensor together with the light-source lamp and reflecting mirrors, still another structure where one of first and second optical carriages is installed with the light-source lamp and reflecting mirrors, and the other carriage is installed with the image-formation lens and the photoelectric conversion sensor, etc.

In any one of the structures, the optical carriage is supported in the apparatus frame to be movable in the sub-scanning direction by a rail member, and in the apparatus frame is disposed a carriage motor for causing the carriage to reciprocate at a predetermined velocity. In the optical carriage supported to be movable in the sub-scanning direction, there is the fear that the carriage moves and that a constituent component is broken in the apparatus transport process. To prevent the accident by movement of the carriage, a method is adopted of fixing the carriage by packing in order for the carriage not to move accidentally in packing the apparatus.

Japanese Patent Gazette No. 3933282 proposes a locking mechanism for fixing an optical carriage. In the Document, an apparatus frame is provided with a lock plate to be movable between a lock position and a lock release position, the front end of the lock plate is fitted into a slit provided in a carriage frame, and the carriage is thereby prevented from moving in the sub-scanning direction. Further, in the Document, part of the lock plate is configured to cover a connector in which a power supply cord is installed, and the lock plate is configured to engage in the carriage to lock in the lock position, while inhibiting installation of the power supply cord. Then, the apparatus is proposed that installation of the power supply cord is permitted concurrently with releasing the lock of the carriage in the release position.

As described above, it is proposed in above-mentioned Japanese Patent Gazette No. 3933282, etc. to provide the lock mechanism in the optical carriage supported in the apparatus frame to be able to reciprocate. This is because such an accident may occur that the optical carriage gets out of balance and falls when moving accidentally in storing the apparatus in a packing case to carry, or moving the portable apparatus when necessary by a user. Concurrently therewith, when the optical carriage vigorously collides with the apparatus internal wall, a constituent component mounted on the carriage is broken or displaced, and may result in a cause of apparatus failure.

Therefore, conventionally, as disclosed in above-mentioned Japanese Patent Gazette No. 3933282, it has been attempted to provide the apparatus frame with the lock plate, move the plate member to a locking attitude, and fix the carriage. In other words, the carriage is fixed in a predetermined attitude by coupling the carriage and the external frame with the lock plate.

Then, such a structure has conventionally been adopted that the lock plate and carriage are coupled by fitting a fit protrusion formed in one of them into a slit groove formed in the other one, and that the carriage is inhibited from moving in the sub-scanning direction by the coupling of them. In the structure where the carriage is fixed by fitting and coupling two members, the following problem arises.

As a first problem, an operator moves the carriage to a lock position by hand, and while holding the carriage in this position, moves the lock plate to a lock position from a release position, and therefore, the lock engage portion requires a relatively large clearance. The clearance causes the carriage to vibrate intensely when undergoing shock during transport. When the vibration is repeated, the repetition results in breakage of a constituent component mounted on the carriage.

Similarly, when the vibration is repeated, failure such as wearing and rattling occurs in a convey mechanism between the carriage and a carriage driving portion. For example, in the case of the mechanism that the carriage reciprocates by driving wire, when feeble vibration is repeated, a defect occurs in winding the wire, and causes fluctuations in traveling of the carriage.

As a second problem, in the case of the apparatus configuration applying the structure where the carriage is mounted and supported in the flat-shaped rail, even when the movement in the sub-scanning direction is inhibited by the lock plate, the movement in the mount vertical direction perpendicular to the sub-scanning direction is free, and a problem occurs that the carriage floats from the mount rail. This floating is caused by the clearance between the lock plate and carriage, and is an inevitable problem in the conventional lock mechanism.

The inventor of the invention reached the idea that a biasing force is applied to the carriage to increase friction with the rail member in restricting movements in the sub-scanning direction of the carriage by the fit lock structure, and that the carriage is thereby inhibited from floating from the rail, and concurrently, is fixed by the friction acting on the carriage and rail.

It is a main object of the invention to provide an image reading apparatus for enabling an optical carriage movably supported in a rail member to be locked reliably in a predetermined position of an apparatus frame without causing failure by shock in transport.

Further, it is another object of the invention to provide an image reading apparatus for providing easy operation for locking the optical carriage in a predetermined position, and further providing a simplified and inexpensive structure for the easy operation.

BRIEF SUMMARY OF THE INVENTION

To attain the above-mentioned objects, in the invention, one of an apparatus frame and an optical carriage is provided with a lock member traveling between a release position and a lock position, and a biasing member for biasing the lock member in a predetermined direction, and the other one is provided with an engagement receiving portion being fitted with an engagement portion formed in the lock member. Therefore, the present invention is comprised that the engagement portion and the engagement receiving portion are configured to inhibit movements in a scanning direction of the optical carriage in the lock position, and that the biasing force of the biasing member is concurrently configured to act on the carriage in a direction orthogonal to the scanning direction so as to increase friction between the carriage and a traveling rail.

The configuration will be described specifically. An apparatus having a lock mechanism for inhibiting movements of an optical carriage supported slidably in a traveling rail has an apparatus frame, a read platen disposed in the apparatus frame, a traveling rail disposed in the apparatus frame along a scanning direction of the read platen, an optical carriage supported slidably in the traveling rail to apply read light to an image on the read platen, and lock means disposed between the apparatus frame and the optical carriage to inhibit movements of the optical carriage.

The lock means is comprised of a lock member traveling between a release position and a lock position, and a biasing member for biasing the lock member in a predetermined direction, the lock member and the biasing member are disposed in one of the apparatus frame and the optical carriage, the other one of the apparatus frame and the optical carriage is provided with an engagement receiving portion being fitted with an engagement portion formed in the lock member, and the engagement portion and the engagement receiving portion are configured to inhibit movements in the scanning direction of the optical carriage when the lock member is in the lock position, while the biasing member applies the biasing force in the direction orthogonal to the scanning direction of the optical carriage to the engagement receiving portion and is thus disposed to increase friction between the optical carriage and the traveling rail.

ADVANTAGEOUS EFFECT OF THE INVENTION

The present invention provides one of an apparatus frame and an optical carriage with a lock member capable of traveling between a release position and a lock position, and a biasing member for biasing the lock member in a predetermined direction, further provides the other one with an engagement receiving portion being fitted with an engagement portion formed in the lock member, where the engagement portion and the engagement receiving portion are configured to inhibit movements in the scanning direction of the optical carriage in the lock position, while the biasing force of the biasing member is configured to act on the carriage in the direction orthogonal to the scanning direction, and therefore, has the following outstanding effects.

The optical carriage is inhibited from moving in the scanning direction by the engagement portion formed in the lock member provided between the carriage and apparatus frame and the engagement receiving portion formed in the other one. At this point, the engagement portion is acted upon by the biasing force pressing the carriage against the traveling rail (in the direction orthogonal to the scanning direction). Therefore, even when a relatively large clearance (gap) is formed between the engagement portion and the engagement receiving portion, the carriage neither floats from the rail member nor rattles, and further, abnormal noise does not occur during transport. Concurrently therewith, the carriage is rested and held in the position within the clearance of the fit portion by friction with the rail member by the biasing force from the biasing member.

Thus, in the invention, the clearance is formed between the engagement portion and engagement receiving portion that are mutually fitted, the carriage neither floats from the rail nor rattles by the clearance, and it is possible to rest and lock the carriage reliably in a predetermined position.

Further, in the invention, the lock member, first rail member and second rail member are arranged in this order in the longitudinal direction (main scanning direction) of the carriage, the first rail member is configured in the shape of a rod, the second rail member is configured in a flat shape in cross section, the lock member and the second rail member are thereby disposed opposite to each other with respect to the first rail member fitted and supported as the center, and the carriage does not float from the second rail member.

BRIEF DESCRIPTION OF THE SEVERAL VIEWS OF THE DRAWINGS

FIG. 10 shows a modification of the biasing member according to the invention, where

DETAILED DESCRIPTION OF THE INVENTION

[Configuration of an Optical Carriage]

Figure 1:
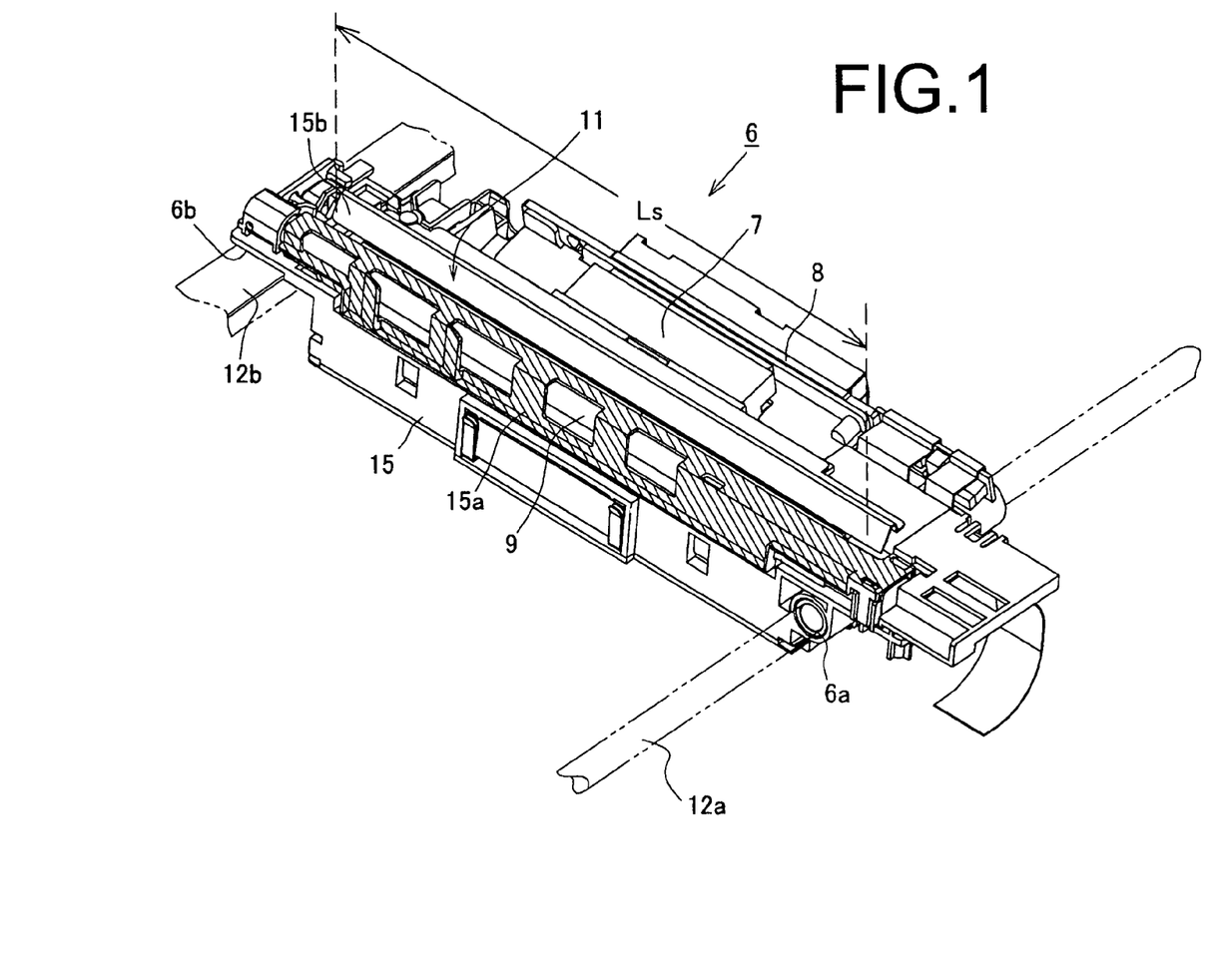
FIG. 1 is an explanatory view of the entire configuration of an optical carriage according to the invention.
Figure 2:
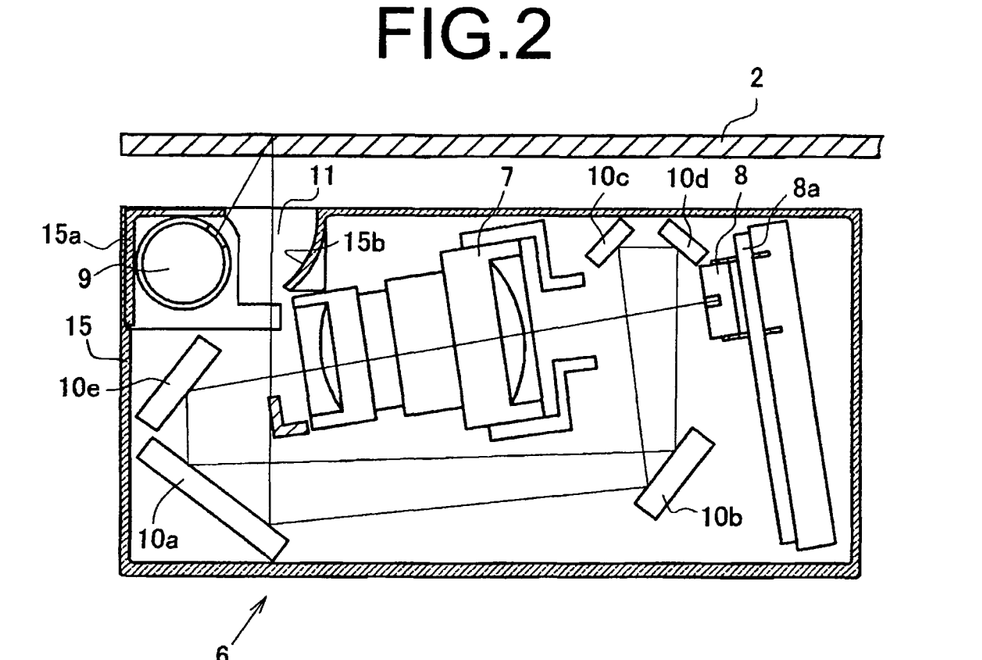
FIG. 2 is an explanatory view of a cross-sectional configuration of the optical carriage of FIG. 1.

Described first is a configuration of an optical carriage according to the invention. As shown in FIG. 1, an optical carriage (hereinafter, referred to as a "carriage") 6 according to the invention is comprised of a carriage frame 15, light source 9, reflecting mirrors 10, condenser lens 7, and image reading sensor 8. For example, the carriage frame 15 is made of a resin rich in heat resistance, and is installed with the light-source lamp 9, imaging device (reflecting mirrors and condenser lens), and the image reading sensor 8.

In the carriage frame 15 is formed a read opening 11 corresponding to an effective reading width Ls (see FIG. 1) of an original sheet, light is applied to the original sheet through the read opening 11, and the reflected light is applied onto the image reading sensor 8 by the imaging device. Then, the carriage frame 15 is provided with engagement portions 6a, 6b engaging in first and second rail members 12a, 12b prepared in a scanner unit A. In the apparatus as shown in the figure, the first and second rail members are formed of a guide rod 12a and guide rail 12, a pair of the members are disposed to the left and right of a platen 2 described later, and the carriage frame 15 is provided with a bearing engagement portion 6a being fitted with the guide rod 12a and a slide engagement portion 6b engaging in the guide rail 12b.

Figure 9:
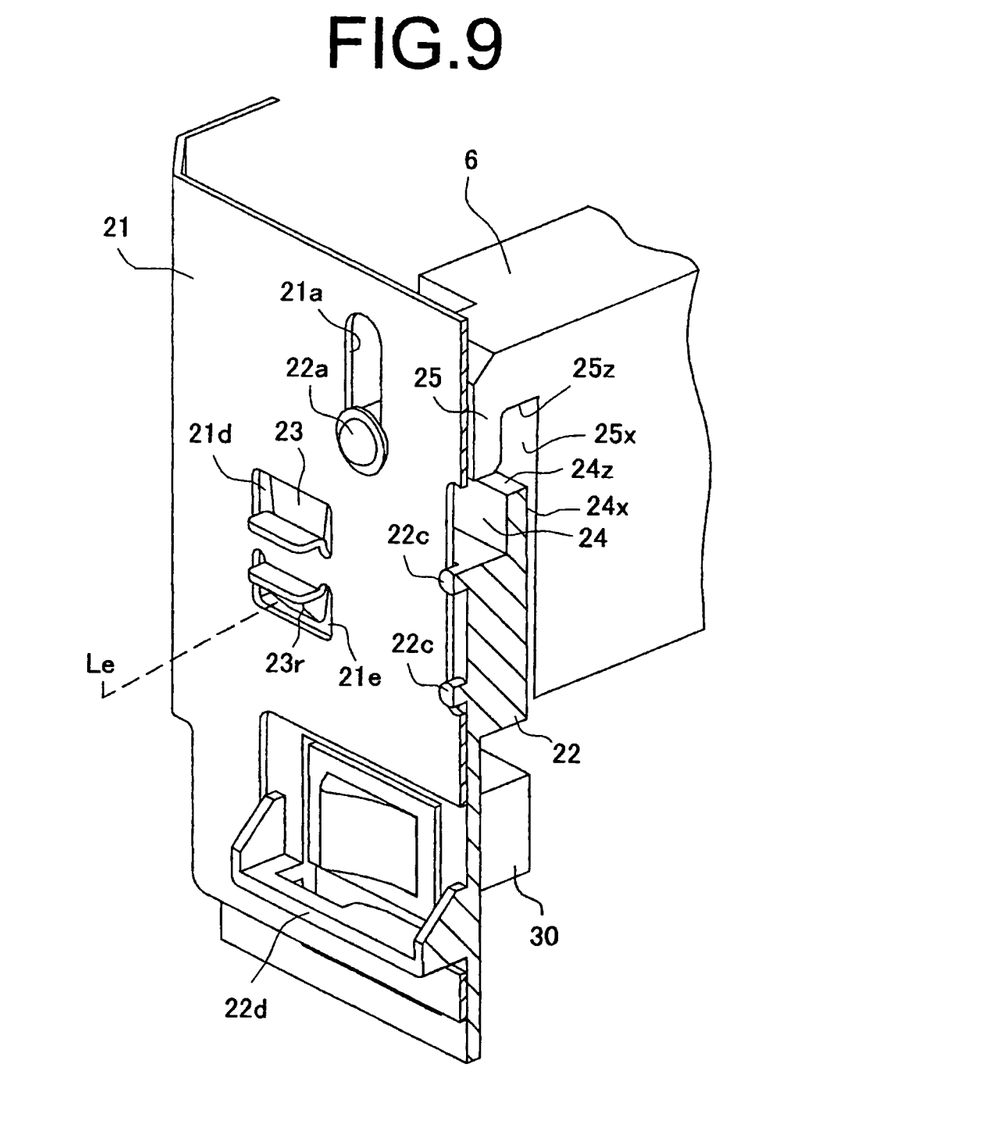
FIG. 9 is a side cross-sectional view of FIG. 8.

As shown in FIG. 9, the light source 9 is comprised of a light-source lamp applying linear light along the effective reading width Ls formed in the read opening 11 of the carriage frame 15. "15a" shown in the figure denotes a heat-resistant lamp cover, and "15b" shown in the figure denotes a reflector. The light source (light-source lamp) 9 adopts a reflective structure for applying light of a rod-shaped emitter such as a fluorescent lamp and xenon lamp or dot-shaped light-emitting devices as linear light. Thus configured light source 9 is integrally attached to the sheet on the platen 2, described later, from the read opening 11.

The reflecting mirrors 10 are comprised of a plurality of mirrors as appropriate so as to form an optical path length with a predetermined length. In the mirrors as shown in the figure, a first mirror 10a reflects the reflected light of the original image toward a second mirror 10b, the light is guided to a fourth mirror 10d from a third mirror 10c, and then, the light from the fourth mirror 10d is guided to the condenser lens 7 via the second mirror 10b, then the first mirror 10a and a fifth mirror 10e. In addition, the reflected light of the original image is not limited to such optical path formation, and for example, it is possible to form an optical path using two, first and second, mirrors.

The condenser lens 7 is formed of a single or plurality of imaging lenses, and condenses the reflected light of the original image sent from the reflecting mirror 10 on the image reading sensor 8 for image formation. Further, the image reading sensor 8 is comprised of a photoelectric conversion sensor such as CCD, and performs photoelectric conversion on the reflected light of the original image sent from the condenser lens 7. Particularly, the image reading sensor 8 shown in the figure is comprised of a color line sensor, where three lines of sensor elements forming pixels of R (Red), G (Green) and B (Blue) are arranged in line form. The image reading sensor 8 with such a configuration is attached to a substrate 8a, and the substrate 8a is secured to the carriage frame 15.

[Lock Mechanism]

As described above, the carriage 6 is supported slidably by the first rail member (guide rod) 12a and second rail member (guide rail) 12b spaced a distance apart from each other in the scanning direction (x direction in FIG. 3) of the platen 2. Then, the carriage 6 is bearing-engaged in a circular rail surface (bearing engagement portion) 6a of the first rail member 12a, and at the same time, is mount-engaged in the flat-shaped rail surface (slide engagement portion) 6b of the second rail member 12b. The first rail member 12a and second rail member 12b are disposed in a frame 21. When the frame 21 is configured in monocoque structure integrated with an external case 20, the frame 21 is integrally formed in the external case 20. The frame 21 shown in the figure is integrally formed in one side wall of the external case 20 as a reinforcing member.

Figure 4:
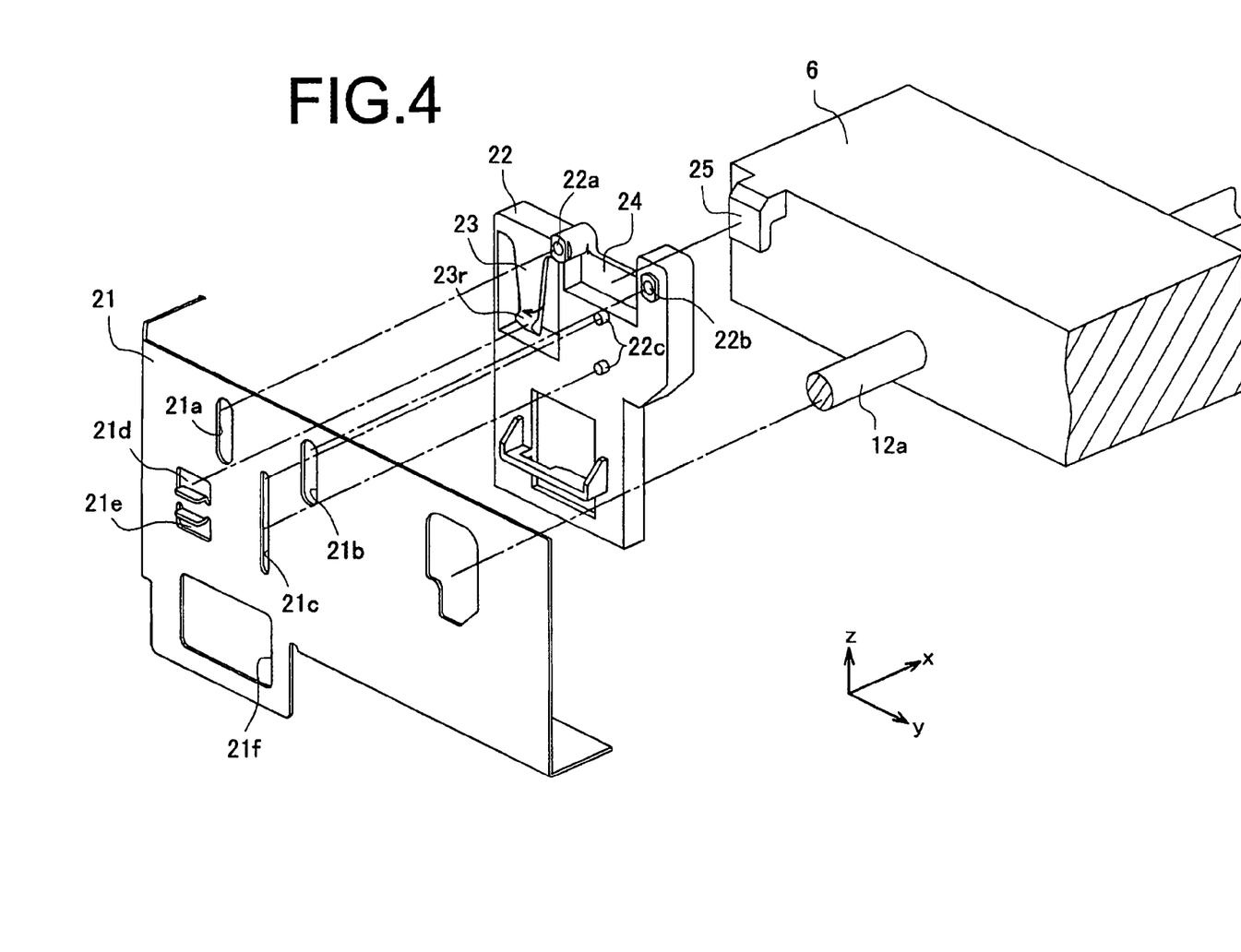
FIG. 4 is an assembly exploded perspective view of an apparatus of FIG. 3.

The lock mechanism of the invention is comprised of the frame 21, lock member 22 and carriage 6 as shown in FIG. 4, and the frame 21 is comprised of a sheet metal frame lined on the inner wall of the external case 20. The biasing member 23 is integrally formed in the lock member 22 as an elastic piece, as described later. Then, an engagement portion 24 is formed in the lock member 22, and an engagement receiving portion 25 is formed in the carriage 6.

Figure 3:
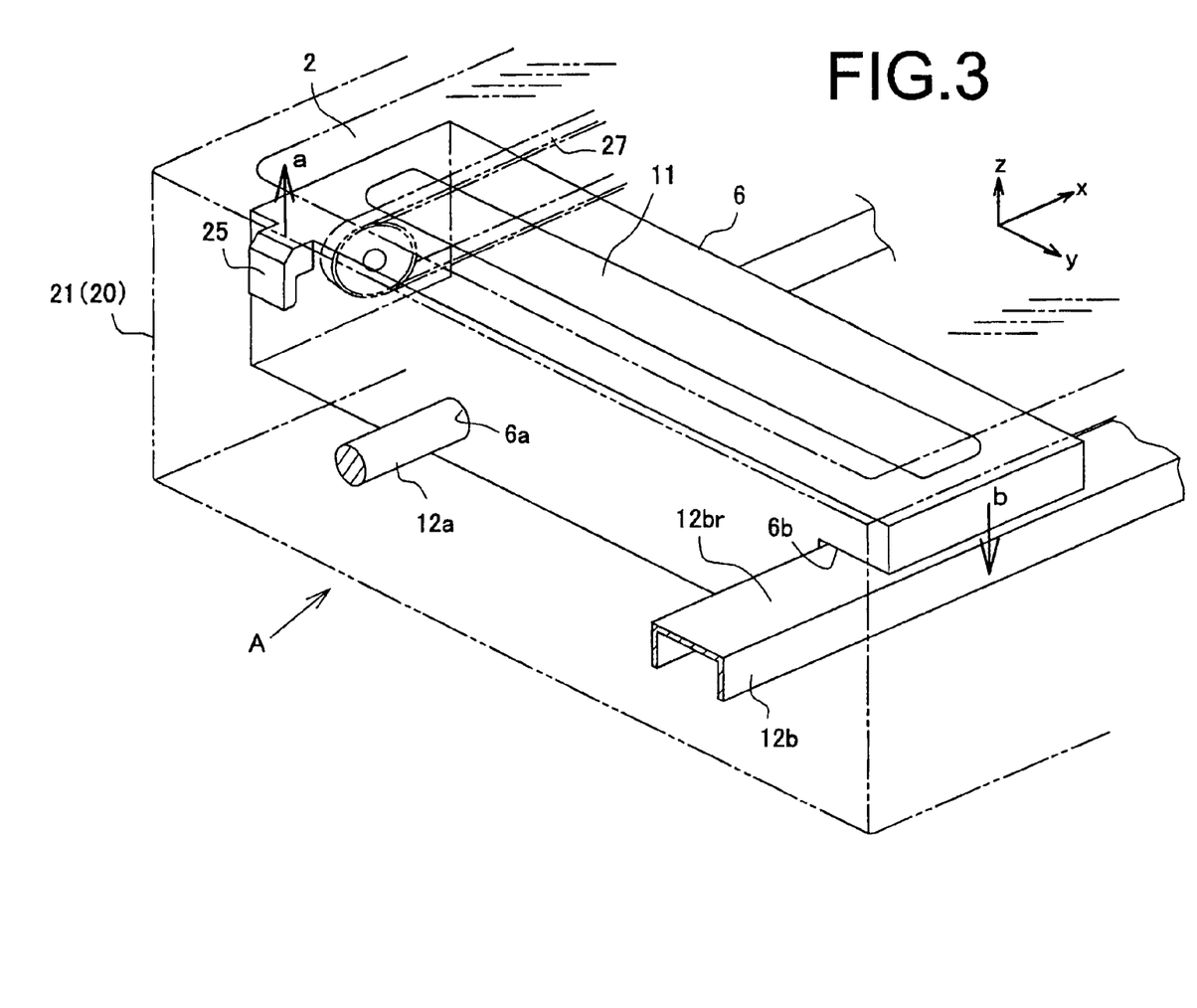
FIG. 3 is a conceptual explanatory view illustrating the scanning direction of the optical carriage according to the invention.

As shown in FIG. 3, the frame 21 is integrally formed in the external case 20, and is provided with slit grooves 21a, 21b, 21c for slidably supporting the lock member 22, and in the slit grooves 21a to 21c are fitted and supported guide pins 22a, 22b, 22c of the lock member 22 described later. Further, the frame 21 is provided with locking concave portions 21d, 21e to latch and lock a latch protrusion 23r of the elastic piece (biasing member) 23 of the lock member 22. With respect to the locking concave portions 21d, 21e, the concave portion 21d is disposed in a lock position (Ro), while the concave portion 21e is disposed in a release position (Le), in the lock member 22 described later. Further, the frame 21 is provided with a switch opening 21f to expose an operation switch 30 of an apparatus power supply disposed inside the external case 20 to the outside of the apparatus.

Figure 5:
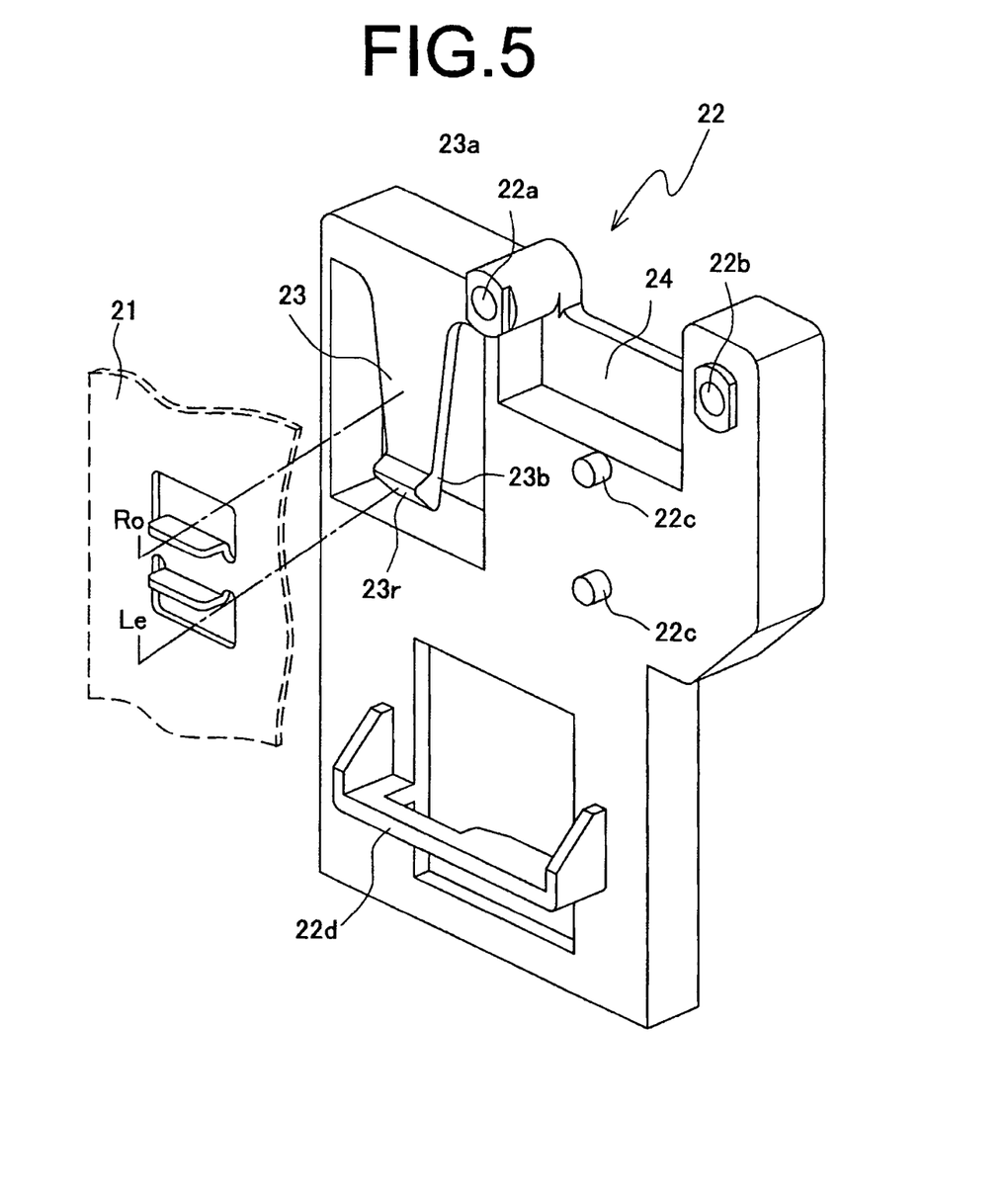
FIG. 5 is a perspective view of a slide member in the apparatus of FIG. 4.

As shown in FIG. 5, the lock member 22 is integrally provided with the elastic piece (biasing member) 23, and hereinafter, this member is referred to as a slide member 22. The slide member 22 is provided with the engagement portion 24, guide pins 22a, 22b, 22c, a shutter portion 22.d to cover the operation switch 30, and the elastic piece (biasing member) 23. Then, the guide pins 22a, 22b, 22c are integrally embedded in the slide member 22, and are configured in the shape adapting to the slit grooves 21a, 21b, 21c of the frame 21.

Accordingly, by fitting the guide pins 22a to 22c into the slit grooves 21a to 21c of the frame 21, the slide member 22 is attached to the frame 21 slidably. Then, in the slide member 22, the lock position Ro and release position Le are set by slide operation.

The engagement portion 24 is fitted into the engagement receiving portion 25 provided in the carriage 6, described later, and is formed to be coupled to each other (movement restriction). The engagement portion 24 integrally formed in the slide member (lock member) 22 is configured in the shape mutually fitting with the engagement receiving portion 25 of the carriage 6 as shown in FIG. 4, and the shape meets the following conditions.

The engagement portion 24 is provided in a position such that the portion 24 is fitted into the engagement receiving portion 25 when the slide member (lock member) 22 is in the lock position Ro, while being released from the fit when the member 22 is in the release position Le. In other words, the engagement portion 24 is provided in the end edge (in the figure, the upper end edge) in the traveling direction of the slide member (lock member) 22, and is configured to be locked and released from the lock by slide traveling of the slide member (lock member) 22.

Figure 7A:
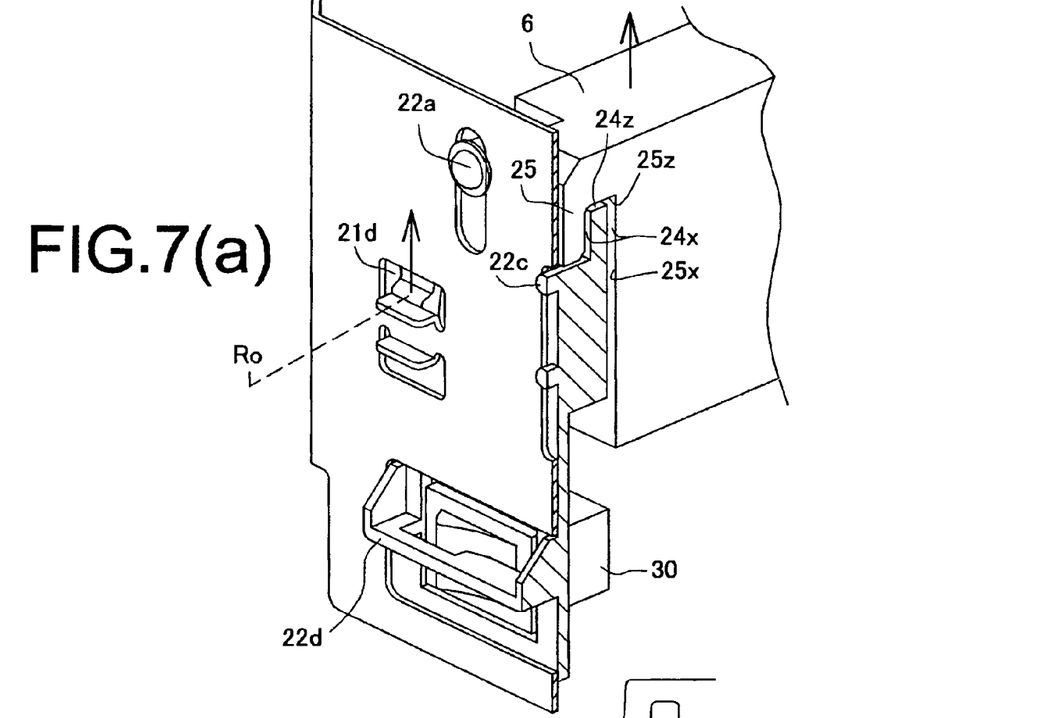
FIG. 7(a) shows a side cross-sectional view of the apparatus of FIG. 6.
Figure 7B:
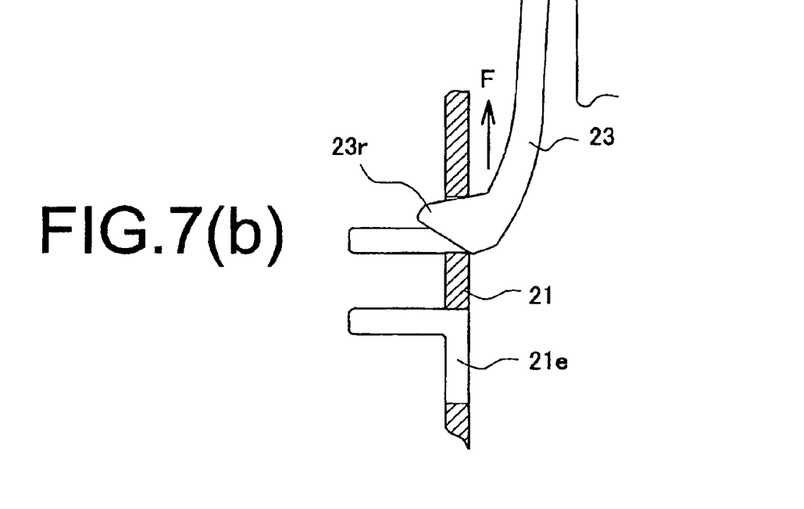
FIG. 7(b) is an explanatory view illustrating action of a biasing member.

Next, the engagement portion 24 is fitted into the engagement receiving portion 25 of the carriage 6, and restricts traveling in the scanning direction (x direction in FIG. 4) of the carriage 6. Therefore, the engagement portion 24 is configured in the shape of latching the engagement receiving portion 25 so as to restrict movements in the scanning direction (x direction in FIG. 4). The lock state is shown in FIGS. 7(a) and 7(b), an engagement surface 24x of the engagement portion 24 and an engagement surface 25x of the engagement receiving portion 25 are mutually fitted as shown in the figure, and in this fit state, the carriage 6 is restricted in movements in the scanning direction (x direction in FIG. 4) and is fixed to this position.

Further, the engagement portion 24 is configured in the shape of applying the biasing force in the direction (z direction in FIG. 3) orthogonal to the scanning direction to the engagement receiving portion 25 in the lock position where the portion 24 is fitted with the engagement receiving portion 25. In the engagement portion 24, the engagement surface 24z comes into contact with the engagement surface 25z of the engagement receiving portion 25 in the lock position. When the biasing force in the arrow direction shown in the figure acts toward the engagement portion 24 side, the force in the same direction is exerted on the engagement receiving portion 25, and this force acts to increase friction between the carriage 6 and the guide rail (second rail member) 12b.

The carriage 6 is provided with the engagement receiving portion 25 as described above, and the engagement receiving portion 25 is restricted in movements in the scanning direction (x direction) in the lock state where the portion 25 is engaged with the engagement portion 24 of the lock member (slide member) 22, concurrently undergoes the action force in the direction (z direction) orthogonal to the scanning direction (x direction), and increases engagement friction with the guide rail (second rail member) 12b.

Therefore, with respect to the engagement receiving portion 25 of the carriage 6, as shown in FIG. 3, in the direction (y direction) orthogonal to the scanning direction (x direction) of the platen 2 are arranged a carriage driving member (driving belt) 27, the lock member 22, the first rail member (guide rod) 12a, and the second rail member (guide rail) 12b, in this order. In such an arrangement, when the engagement receiving portion 25 undergoes the force in the direction of the arrow a in FIG. 3, this force acts on a rail surface 12br of the guide rail (second rail member) 12b as the force in the arrow b direction by the guide rod (first rail member) 12a as the center. This force in the arrow b direction increases friction of the rail surface 12br and rests the carriage 6 in this position. Further, the carriage driving member (driving belt) 27 is coupled to a driving motor not shown, and is configured to move the carriage 6 in the scanning direction (x direction) to read.

The elastic piece (biasing member) 23 is integrally formed in the slide member 22 (lock member; the same in the following). The slide member 22 is made of a synthetic resin, and is integrally provided with the elastic piece (biasing member) 23 by mold forming. In the elastic piece 23, a base end portion 23a is joined to the slide member 22, and a front end portion 23b becomes elastically deformed in the arrow direction shown in the figure (see FIG. 7(b)). Then, the front end portion 23b is provided with the latch protrusion 23r, and the latch protrusion 23r engages in the locking concave portions 21d, 21e as described previously formed on the opposite frame 21 side. In other words, in the frame 21, the locking concave portion 21d is provided in the lock position Ro, the locking concave portion 21e is provided in the release position Le, and the latch protrusion 23r is kept in the position by its own elastic force in the state of engaging in each locking concave portion 21d, 21e.

The elastic piece (biasing member) 23 is curved and deformed as shown in FIG. 7(b) and exerts the elastic force in the arrow direction shown in the figure, in the state where the latch protrusion 23r is fitted into the locking concave portion 21d in the lock position Ro. Thus, the latch protrusion 23r engages in the locking concave portions 21d, 21e, is kept in the position by its own elastic force, and is configured to exert the biasing force in the predetermined direction on the slide member 22 in the state of the lock position Ro. Then, the predetermined direction is set at the direction of increasing friction between the carriage 6 and rail surface 12br via the engagement portion 24 as described previously.

The slide member 22 is provided with the shutter portion 22d, and the shutter portion 22 is disposed in the switch opening 21f formed in the frame 21 to cover part of the opening. As described previously, the switch opening 21f is disposed to expose the operation switch 30 disposed inside the external case to the outside. Then, the shutter portion 22d covers part of the switch opening 21f to inhibit switch operation in the lock position Ro, while opening the switch opening 21f to enable the switch operation in the release position Le. In addition, the shutter portion 22d protrudes from the slide member 22 toward the opposite frame 21 side, and covers the switch opening 21f formed in the frame 21. Then, this shutter portion 22d acts also as an operation piece of the slide member 22. Accordingly, the shutter portion 22d protruding outside from the external case 20 is grasped to operate and move the slide member 22 between the lock position Ro and release position Le.

Figure 6:
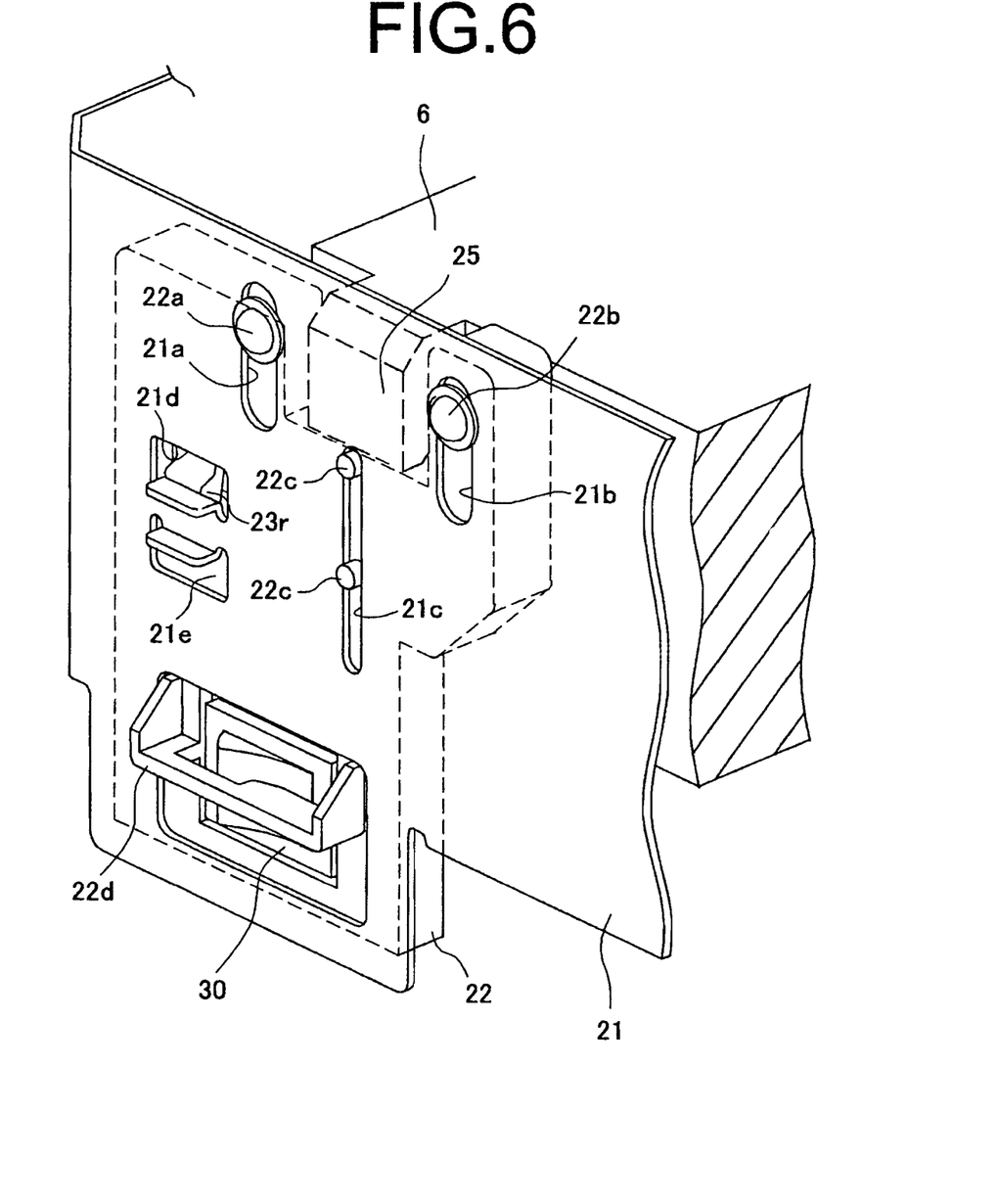
FIG. 6 is an explanatory view showing a lock state of the carriage in the apparatus of FIG. 4.

The action of the above-mentioned lock mechanism will be described below. FIGS. 6 and 7 show the lock state where the carriage 6 reciprocating along the first and second rail members 12a, 12b is fixed to the predetermined position. In this lock state, the slide member (lock member) 22 is held in the locking concave portion 21d in the lock position Ro. Then, the engagement portion 24 is fitted with the engagement receiving portion 25 of the carriage 6, and the engagement surface 24x restricts the position of the engagement surface 25x so as to inhibit the carriage 6 from traveling in the scanning direction (x direction) (see FIG. 7).

Concurrently therewith, the engagement portion 24 undergoes the biasing force F in the orthogonal direction (z direction) orthogonal to the scanning direction (x direction) from the elastic piece (biasing member) 23 as shown in FIG. 7(b), and this biasing force F acts, in the direction shown by the arrow, on the engagement surface 25z of the engagement receiving portion 25 of the carriage 6 by the engagement surface 24z. This biasing force F acts on the carriage 6 to increase engagement friction with the guide rail (second rail member) 12b. In addition, in this lock state, the shutter portion 22d of the slide member 22 covers the operation opening of the operation switch 30, and is held in the position to inhibit the operation.

Figure 8:
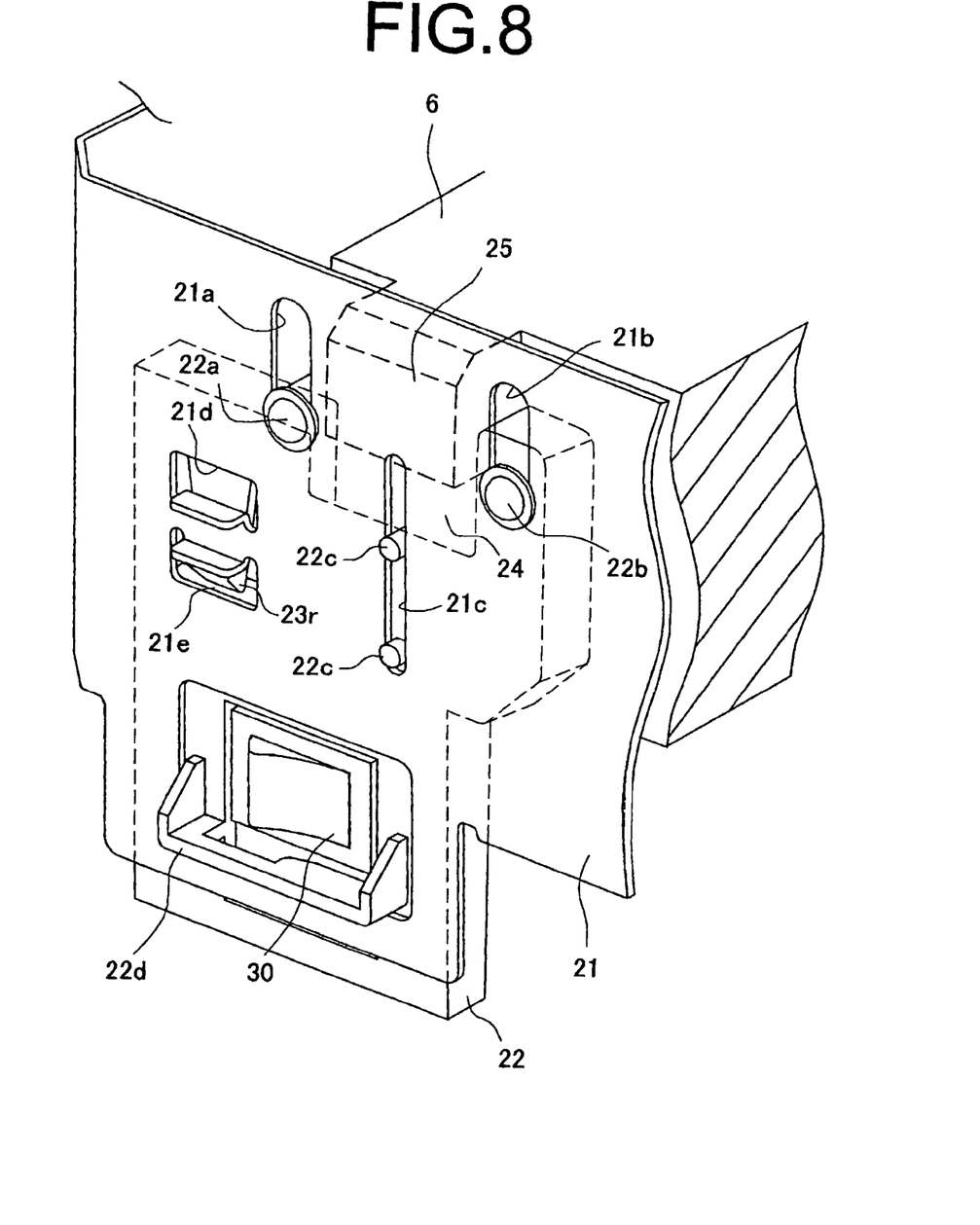
FIG. 8 is an explanatory view showing a release state of the carriage in the apparatus of FIG. 4.

Next, FIGS. 8 and 9 show the release state of the lock mechanism. In this release state, the slide member 22 is held in the locking concave portion 21e in the release position Le. Then, the engagement portion 24 is spaced apart from the engagement receiving portion 25 of the carriage 6, and thus, the portions 24 and 25 are mutually released from the engagement. In this state, the carriage 6 is released from the lock state and becomes free. Concurrently therewith, in the operation switch 30, the shutter portion 22d moves outward from the switch opening 21f to enable the switch to be operated.

Figures 10A, 10B:
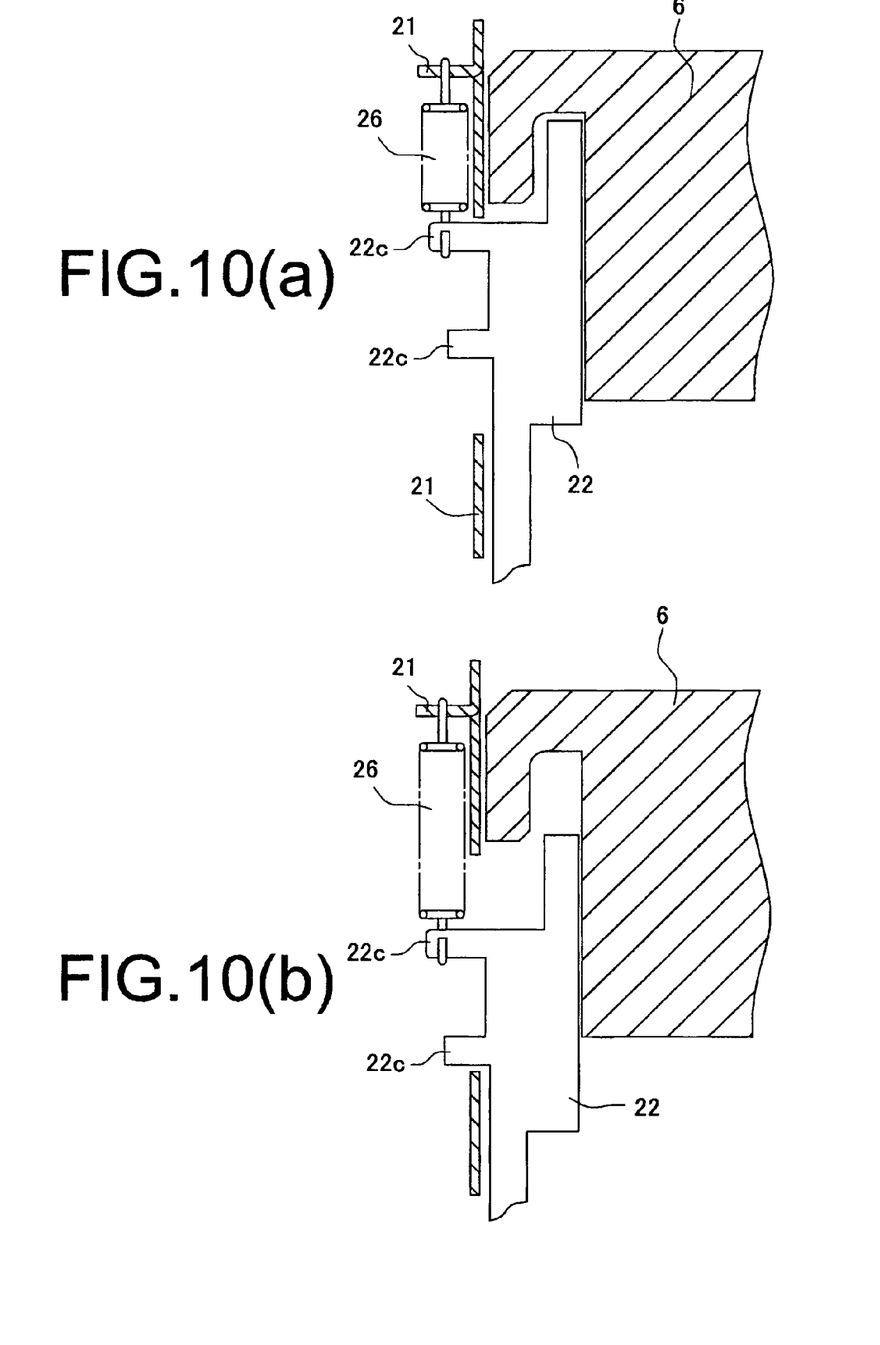
FIG. 10(a) is an explanatory view showing a lock state.
FIG. 10(b) is an explanatory view showing a release state.

In addition, in the above-mentioned apparatus, the case is shown where the biasing member for locking the lock member (slide member) 22 in the lock position Ro and release position Le is formed of the elastic piece 23, and as shown in FIG. 10, the biasing means can be formed of a spring 26 for biasing the lock member (slide member) 22 in the z direction in FIG. 3. The other configuration is the same as in the foregoing, and specific descriptions are omitted.

In addition, this application claims priority from Japanese Patent Application No. 2009-150700 incorporated herein by reference.

What is claimed is:
1. An optical reader apparatus having a lock mechanism for inhibiting a movement of an optical carriage supported slidably in a traveling rail, comprising:
an apparatus frame;
a read platen disposed in the apparatus frame;
a traveling rail disposed in the apparatus frame along a scanning direction of the read platen;
an optical carriage supported slidably in the traveling rail to apply read light to an image on the read platen; and lock means disposed between the apparatus frame and the optical carriage to inhibit a movement of the optical carriage, wherein the lock means is comprised of a lock member traveling between a release position and a lock position, and a biasing member for biasing the lock member in a predetermined direction, the lock member and the biasing member are disposed in one of the apparatus frame and the optical carriage, the other one of the apparatus frame and the optical carriage is provided with an engagement receiving portion being fitted with an engagement portion formed in the lock member, and the engagement portion and the engagement receiving portion are configured to inhibit a movement in a scanning direction of the optical carriage when the lock member is in the lock position, while the biasing member applies a biasing force in a direction orthogonal to the scanning direction of the optical carriage to the engagement receiving portion and is thus disposed to increase friction between the optical carriage and the traveling rail.

2. The optical reader apparatus according to claim 1, wherein the traveling rail is comprised of a pair of rail members spaced a distance apart from each other along the scanning direction of the read platen, the lock member, a first rail member and a second rail member are disposed in this order in a direction orthogonal to the scanning direction of the read platen in the lock means, and the biasing member applies the biasing force to the engagement portion of the lock member to increase friction for the optical carriage to come into slide-contact with the second rail member.

3. The optical reader apparatus according to claim 2, wherein in the pair of rail members, the first rail member is configured in a circular shape in cross section, and the second rail member is configured in a flat shape in cross section, while the optical carriage is fitted and supported in the shaft member, while being mounted and supported in the rail member.

4. The optical reader apparatus according to claim 1, wherein the lock member and the biasing member are integrally formed in a slide member attached movably to the apparatus frame, the slide member is able to travel between a lock position and a release position, and the engagement portion and an elastic piece forming the biasing member are integrally formed in the slide member.

5. The optical reader apparatus according to claim 4, wherein the slide member is provided with a shutter portion for opening and covering an operation switch of an apparatus power supply, and the shutter portion covers and enables the operation switch not to be operated in the lock position, while opening and enabling the operation switch to be operated in the release position.

6. The optical reader apparatus according to claim 4, wherein the elastic piece integrally formed in the slide member is provided with a latch portion engaging in locking concave portions formed in the apparatus frame in the lock position and the release position, the latch portion holds the slide member in each of the lock position and the release position, while applying the biasing force to the engagement portion in the lock position, and the biasing force acts on to the engagement receiving portion to increase the friction between the optical carriage and the traveling rail.

\* \* \* \* \*